United States Patent
Endo

(10) Patent No.: US 11,276,860 B2
(45) Date of Patent: Mar. 15, 2022

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventor: Kazuki Endo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 16/493,512

(22) PCT Filed: Feb. 8, 2018

(86) PCT No.: PCT/JP2018/004362
§ 371 (c)(1),
(2) Date: Sep. 12, 2019

(87) PCT Pub. No.: WO2018/168272
PCT Pub. Date: Sep. 20, 2018

(65) Prior Publication Data
US 2021/0135229 A1  May 6, 2021

(30) Foreign Application Priority Data
Mar. 16, 2017  (JP) .............................. JP2017-050980

(51) Int. Cl.
*H01M 4/62* (2006.01)
*H01M 4/485* (2010.01)
(Continued)

(52) U.S. Cl.
CPC ........... *H01M 4/628* (2013.01); *H01M 4/485* (2013.01); *H01M 4/661* (2013.01); *H01M 4/667* (2013.01);
(Continued)

(58) Field of Classification Search
None
See application file for complete search history.

(56) References Cited

U.S. PATENT DOCUMENTS

| 2007/0048613 A1 | 3/2007 | Yanagida et al. |
| 2012/0058375 A1 | 3/2012 | Tanaka et al. |

(Continued)

FOREIGN PATENT DOCUMENTS

| CN | 105742573 A | 7/2016 |
| JP | 2012-74359 A | 4/2012 |

(Continued)

OTHER PUBLICATIONS

International Search Report dated Mar. 13, 2018, issued in counterpart application No. PCT/JP2018/004362, with English translation. (4 pages).

(Continued)

*Primary Examiner* — Eli S Mekhlin
(74) *Attorney, Agent, or Firm* — Westerman, Hattori, Daniels & Adrian, LLP

(57) ABSTRACT

A positive electrode includes a positive electrode current collector based on aluminum, a positive electrode mixture layer disposed on the positive electrode current collector and including a lithium transition metal oxide, and a protective layer disposed between the positive electrode current collector and the positive electrode mixture layer. The protective layer includes inorganic particles, a conductive agent and a binder, the inorganic particles being a major component of the protective layer. The protective layer includes a first region disposed on the positive electrode current collector over substantially the entirety of a section covered with the positive electrode mixture layer, and a second region disposed on the positive electrode current collector so as to extend from a periphery of the positive electrode mixture layer. The weight per unit area of the second region (Continued)

is not less than 1.5 times the weight per unit area of the first region.

9 Claims, 2 Drawing Sheets

(51) Int. Cl.
 *H01M 4/66* (2006.01)
 *H01M 10/0525* (2010.01)
 *H01M 10/0585* (2010.01)
 *H01M 4/02* (2006.01)

(52) U.S. Cl.
 CPC ... *H01M 10/0525* (2013.01); *H01M 10/0585* (2013.01); *H01M 2004/021* (2013.01); *H01M 2004/028* (2013.01)

(56) References Cited

U.S. PATENT DOCUMENTS

| | | | |
|---|---|---|---|
| 2013/0089781 A1* | 4/2013 | Miyazaki | H01M 4/668 429/211 |
| 2016/0190566 A1 | 6/2016 | Shiozaki et al. | |

FOREIGN PATENT DOCUMENTS

| | | |
|---|---|---|
| JP | 2012-234822 A | 11/2012 |
| JP | 2013-45659 A | 3/2013 |
| JP | 2016-127000 A | 7/2016 |

OTHER PUBLICATIONS

English Translation of Chinese Search Report dated Sep. 23, 2021, issued in counterpart CN application No. 201880007795.5. (2 pages).

* cited by examiner

POSITIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present disclosure relates to a positive electrode for nonaqueous electrolyte secondary batteries, and to a nonaqueous electrolyte secondary battery.

BACKGROUND ART

A positive electrode for nonaqueous electrolyte secondary batteries (hereinafter, written simply as "positive electrode") includes a positive electrode current collector and a positive electrode mixture layer disposed on the current collector. In the positive electrode, a portion of the surface of the current collector is exposed from the positive electrode mixture layer. This exposed portion serves as, for example, a lead which will be electrically connected to a positive electrode terminal. The positive electrode is designed to be smaller than a negative electrode to ensure smooth migration of lithium ions between the positive electrode and the negative electrode. With such a design, the exposed portion of the positive electrode current collector is opposed to the negative electrode through a separator therebetween. If foreign matter becomes embedded between the exposed portion of the positive electrode current collector and the negative electrode and penetrates through the separator, the exposed portion is placed into contact with the negative electrode to create a low resistance internal short-circuit in which a high current flows. This event can generate a large amount of heat.

To prevent such a low resistance internal short-circuit, for example, Patent Literature 1 discloses a positive electrode which has an insulating layer formed on an exposed portion of a positive electrode current collector by the application of a binder solution including a binder resin and a solvent, followed by drying.

CITATION LIST

Patent Literature

PTL 1: Japanese Published Unexamined Patent Application No. 2013-45659

SUMMARY OF INVENTION

The insulating layer disclosed in Patent Literature 1 is a thin film made of a binder resin alone, and thus is not so effective in protecting against an internal short-circuit by foreign matter. In particular, the insulating layer will be poorly effective in protecting from an internal short-circuit when the size of foreign matter is large.

Further, nonaqueous electrolyte secondary batteries are required to have small heat generation in the event where a nail or the like penetrates the battery to create an internal short-circuit between a positive electrode and a negative electrode through a positive electrode mixture layer. The technique disclosed in Patent Literature 1 is incapable of attaining small heat generation in such events.

A positive electrode for nonaqueous electrolyte secondary batteries according to an aspect of the present disclosure includes a positive electrode current collector based on aluminum, a positive electrode mixture layer disposed on the positive electrode current collector and including a lithium transition metal oxide, and a protective layer disposed between the positive electrode current collector and the positive electrode mixture layer. The protective layer includes inorganic particles, a conductive agent and a binder, the inorganic particles being a major component of the protective layer. In the positive electrode for nonaqueous electrolyte secondary batteries, the protective layer includes a first region disposed on the positive electrode current collector over substantially the entirety of a section covered with the positive electrode mixture layer, and a second region disposed on the positive electrode current collector so as to extend from a periphery of the positive electrode mixture layer. The weight per unit area of the second region is not less than 1.5 times the weight per unit area of the first region.

A nonaqueous electrolyte secondary battery according to an aspect of the present disclosure includes the positive electrode described above, a negative electrode, a separator disposed between the positive electrode and the negative electrode, and a nonaqueous electrolyte, the protective layer being opposed to the negative electrode through the separator therebetween.

The positive electrode for nonaqueous electrolyte secondary batteries according to one aspect of the present disclosure enables high protection against the occurrence of low resistance internal short-circuit between the positive electrode current collector and the negative electrode, without causing deteriorations in battery characteristics. Further, the positive electrode makes it possible to reduce the amount of heat generated in the event where an internal short-circuit occurs due to nail penetration or the like.

DESCRIPTION OF EMBODIMENTS

Figure 1:
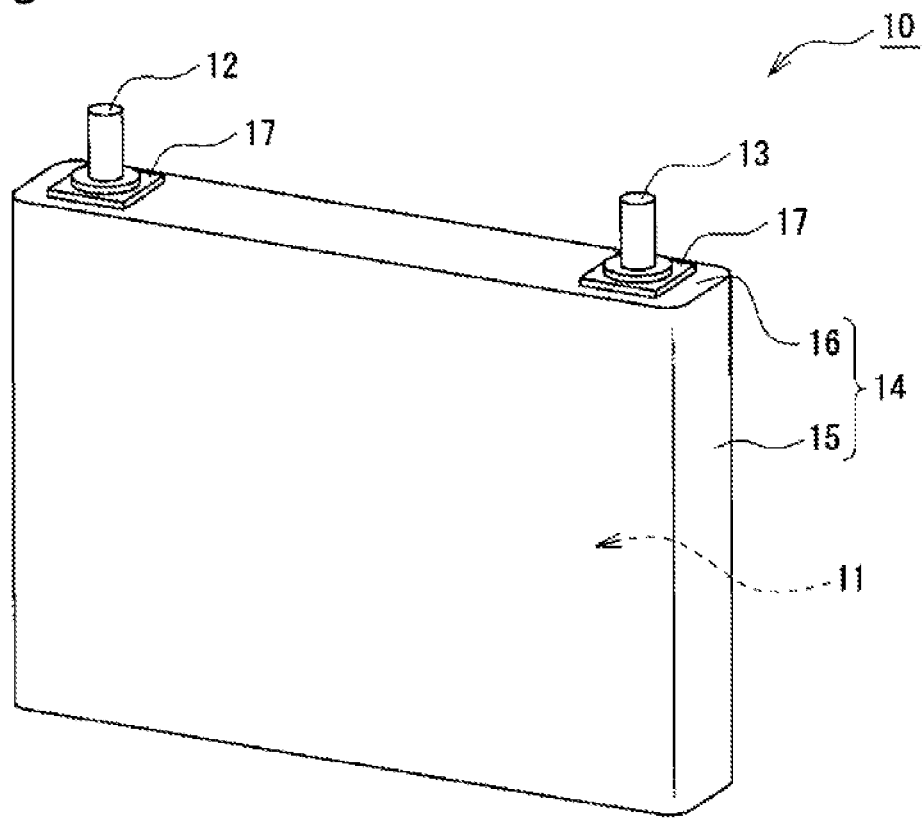
FIG. 1 is a perspective view of a nonaqueous electrolyte secondary battery according to an embodiment.

In a positive electrode according to an aspect of the present disclosure, a protective layer which includes inorganic particles, a conductive agent and a binder, the inorganic particles being the major component of the protective layer, is disposed on a positive electrode current collector so as to extend over substantially the entirety of a section covered with a positive electrode mixture layer and also to extend beyond a periphery of the positive electrode mixture layer. The protective layer based on the inorganic particles is hard and resistant to fracture, and can highly protect from the occurrence of low resistance internal short-circuit between the positive electrode current collector and a negative electrode even in the event where, for example, 200 µm or larger foreign matter becomes embedded therebetween.

In the positive electrode according to one aspect of the present disclosure, the second region of the protective layer, which extends from a periphery of the positive electrode mixture layer, has a weight per unit area that is not less than 1.5 times the weight per unit area of the first region of the protective layer extending to the same extent as the positive electrode mixture layer. With this configuration, the protective layer can highly protect from the occurrence of low resistance internal short-circuit while ensuring good battery performance.

In the event where an internal short-circuit is created between the positive electrode and a negative electrode through the positive electrode mixture layer due to nail penetration or the like, a lithium transition metal oxide as a positive electrode active material undergoes redox reaction with an aluminum current collector based on aluminum (Al) possibly to generate a large amount of heat. The first region of the protective layer isolates the aluminum current collector and the lithium transition metal oxide from each other. That is, the first region also serves to suppress the redox reaction involving the aluminum current collector and thereby to reduce the amount of heat generated in the event of abnormalities.

To suppress the redox reaction, it is preferable that the protective layer be formed with a thickness of not less than 1 μm on the current collector. The simple increase in thickness of the protective layer significantly decreases current collecting properties and results in deteriorated battery performance. The present inventors successfully ensure current collecting properties and maintain good battery characteristics by adding a conductive agent to the protective layer.

Hereinbelow, embodiments of the positive electrode and nonaqueous electrolyte secondary battery of the present disclosure will be described in detail. The drawings used in the description of the embodiments are schematic and may not correctly illustrate configurations such as the dimensional ratio of constituents. Specific configurations such as dimensional ratio should be estimated in consideration of the description given below. In the present specification, the term "substantially" such as in "substantially the entirety of a section" means the entirety of a specific section or a portion of a specific section that can be deemed as substantially the whole.

FIG. 1 is a perspective view of a nonaqueous electrolyte secondary battery 10 according to an embodiment. The nonaqueous electrolyte secondary battery 10 includes an electrode assembly 11 and a nonaqueous electrolyte (not shown). The electrode assembly 11 includes a positive electrode 20, a negative electrode 30, and a separator 40 disposed between the positive electrode 20 and the negative electrode 30 (see FIG. 3 discussed later)_. The electrode assembly 11 includes a plurality of positive electrodes 20, a plurality of negative electrodes 30, and a plurality of separators 40, and is a stack in which the positive electrodes 20 and the negative electrodes 30 are alternately stacked via the separators 40. The positive electrode of the present disclosure may be applied to a wound electrode assembly.

The nonaqueous electrolyte secondary battery 10 is, for example, a lithium ion battery. The electrode assembly 11, which is a generating constituent, and the nonaqueous electrolyte are accommodated in a battery case 14. The battery case 14 is generally composed of a substantially box-shaped case body 15, and a seal body 16 which covers the opening of the case body 15. For example, the nonaqueous electrolyte secondary battery 10 is a prismatic battery. The case body 15 and the seal body 16 are preferably made of a metal material based on aluminum. The structure of the battery case 14 may be conventional.

The seal body 16 is provided with a positive electrode terminal 12 electrically connected to the respective positive electrodes 20, and a negative electrode terminal 13 electrically connected to the respective negative electrodes 30. To the positive electrode terminal 12, positive electrode lead portions 25 that are exposed portions of the surface of positive electrode current collectors 21 (see FIG. 3 discussed later) are connected directly or via other conductive members. To the negative electrode terminal 13, negative electrode lead portions 35 that are exposed portions of the surface of negative electrode current collectors 31 (see FIG. 3 discussed later) are connected directly or via other conductive members. In the following description, for the sake of convenience, the direction in which the positive electrode terminal 12 and the negative electrode terminal 13 are adjacent to each other is defined as the lateral direction, and the direction which is perpendicular to the lateral direction and the direction of stacking of electrodes in the electrode assembly 11 is defined as the vertical direction.

The seal body 16 has through-holes which are not shown on both lateral sides, and the positive electrode terminal 12 and the negative electrode terminal 13, or the conductive members connected to these terminals, are inserted into the battery case 14 through these holes. For example, the positive electrode terminal 12 and the negative electrode terminal 13 are fixed to the seal body 16 via insulating members 17 arranged at the through-holes. The seal body 16 generally has a gas vent mechanism (not shown).

Hereinbelow, the constituents of the nonaqueous electrolyte secondary battery 10 will be described in detail with reference to FIGS. 2 to 4, with a particular emphasis placed on the electrode assembly 11 (particularly, the positive electrodes 20).

[Positive Electrodes]

Figure 2:
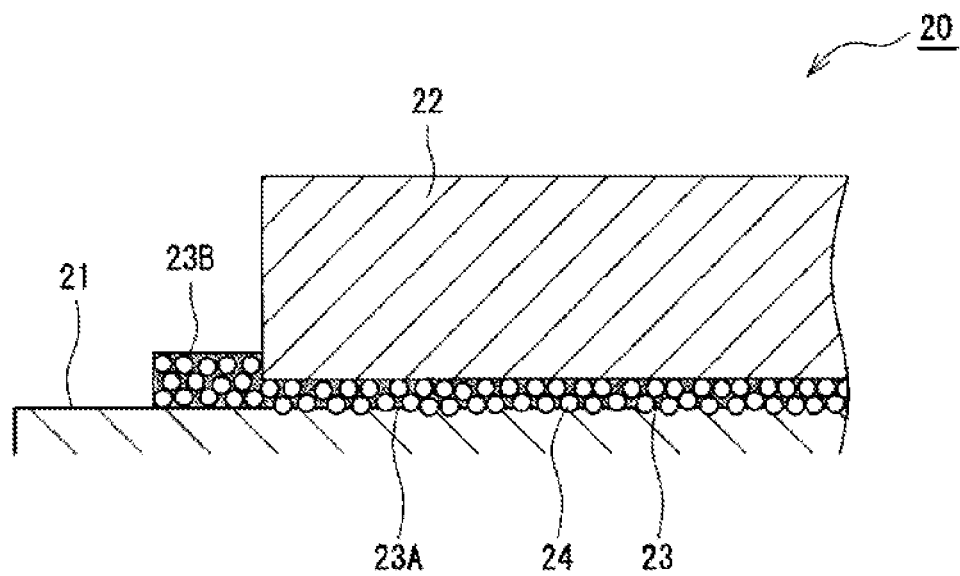
FIG. 2 is a sectional view of a positive electrode according to an embodiment.

FIG. 2 is a sectional view of the positive electrode 20 according to an embodiment. The positive electrode 20 includes a positive electrode current collector 21 based on aluminum (Al), a positive electrode mixture layer 22 which includes a lithium transition metal oxide and is disposed on the positive electrode current collector 21, and a protective layer 23 disposed between the positive electrode current collector 21 and the positive electrode mixture layer 22. The positive electrode mixture layer 22 includes a lithium transition metal oxide an a positive electrode active material, and preferably further includes a conductive agent and a binder. The positive electrode mixture layer 22 is generally formed on both sides of the positive electrode current collector 21.

The positive electrode 20 may be fabricated by, for example, applying a positive electrode mixture slurry including components such as the positive electrode active material and the binder onto the positive electrode current collector 21 having the protective layers 23 thereon, drying the wet films, and rolling the coatings to form positive electrode mixture layers 22 on both sides of the current collector. The positive electrode mixture slurry is applied to the positive electrode current collector 21 except the region which will define a positive electrode lead portion 25. Consequently, this region of the surface of the current collector is exposed from the positive electrode mixture layer 22 to define a positive electrode lead portion 25 of the positive electrode 20.

The positive electrode current collector 21 is, for example, aluminum or an aluminum alloy. The content of aluminum in the positive electrode current collector 21 is not less than 50% of the weight of the current collector, and is preferably not less than 70%, and more preferably not less than 80%. For example, the positive electrode current collector 21 is a metal foil made of aluminum or an aluminum alloy, and has a thickness of about 10 to 100 μm.

Examples of the positive electrode active materials include lithium transition metal oxides containing such transition metals as cobalt (Co), manganese (Mn) and nickel (Ni). Some example lithium transition metal oxides are $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $LixMn_2O_4$, $LixMn_{2-y}M_yO_4$, $LiMPO_4$, and $Li_2MPO_4F$ (M: at least one of Na, Mg, Sc, Y, Mn, Fe, Co, Ni, Cu, Zn, Al, Cr, Pb, Sb and B, $0<x≤1.2$, $0<y≤0.9$, and $2.0≤z≤2.3$). The lithium transition metal oxides may be used singly, or a plurality of such oxides may be used in combination.

The conductive agent contained in the positive electrode mixture layer 22 serves to enhance the electrical conductive properties of the mixture layer. Examples of the conductive agents include carbon materials such as carbon black (CB), acetylene black (AB), Ketjen black and graphite. The conductive agents may be used singly, or two or more may be used in combination.

The binder contained in the positive electrode mixture layer 22 serves to maintain good contacts between the positive electrode active material and the conductive agent and to enhance the adhesion of the components such as the positive electrode active material with respect to the current collector surface. Examples of the binders include fluororesins such as polytetrafluoroethylene (PTFE) and polyvinylidene fluoride (PVdF), polyacrylonitriles (PAN), polyimide resins, acrylic resins and polyolefin resins. These resins may be used in combination with, for example, carboxymethylcellulose (CMC) or a salt thereof (such as CMC-Na, CMC-K or CMC-NH$_4$, or a partially neutralized salt), or polyethylene oxide (PEO). The binders may be used singly, or two or more may be used in combination.

The protective layer 23 includes inorganic particles 24, a conductive agent and a binder, and the inorganic particles 24 are the major component of the protective layer. The inorganic particles 24 represent the largest weight proportion of the components forming the protective layer 23. The conductive agent enhances the conductive properties of the protective layer 23. The binder binds the inorganic particles 24 and the conductive agent to each other, and also binds the components such as the inorganic particles 24 to the current collector surface. The protective layer 23 is disposed on the positive electrode current collector 21, and the positive electrode mixture layer 22 is disposed on the protective layer 23. As mentioned earlier, the positive electrode mixture layer 22 is formed on both sides of the positive electrode current collector 21, and thus the protective layer 23 is preferably formed on both sides of the positive electrode current collector 21.

The protective layer 23 includes a first region 23A disposed on the positive electrode current collector 21 over substantially the entirety of the section covered with the positive electrode mixture layer 22, and a second region 23B disposed on the positive electrode current collector 21 so as to extend from a periphery of the positive electrode mixture layer 22. There is no positive electrode mixture layer 22 on the second region 23B. The first region 23A is overlapped by the positive electrode mixture layer 22 in the direction of thickness of the positive electrode 20, and is disposed between the positive electrode current collector 21 and the positive electrode mixture layer 22. The first region 23A and the second region 23B are continuous without any interruptions. In the present embodiment, the second region 23B is disposed on the base root of the positive electrode lead portion 25.

The first region 23A isolates the aluminum-based positive electrode current collector 21 and the lithium transition metal oxide from each other, and thereby suppresses the redox reaction involving the positive electrode current collector 21. In this manner, the first region 23A reduces the amount of heat generated when an internal short-circuit is created by nail penetration or the like, offering enhanced nail penetration safety of the battery. On the other hand, the second region 23B highly protects from the occurrence of low resistance internal short-circuit between the portion of the positive electrode current collector 21 exposed from the positive electrode mixture layer 22, and the negative electrode 30. The second region 23B is a hard layer based on the inorganic particles 24 and is resistant to fracture even in the case where 200 µm or larger foreign matter is placed in hard contact therewith.

In the protective layer 23, the weight per unit area of the second region 23B is larger than the weight per unit area of the first region 23A. That is, the area density of the second region 23B is higher than the area density of the first region 23A. The weight per unit area of the second region 23B is not less than 1.5 times the weight per unit area of the first region 23A, and is preferably not less than 1.6 times, for example, 1.5 times to 5 times, 1.5 times to 3 times, or 1.6 times to 2.5 times. The second region 23B preferably does not surpass the thickness of the positive electrode mixture layer 22. In this case, the protective layer attains high protection against the occurrence of low resistance internal short-circuit while ensuring good battery performance.

The weight per unit area of the first region 23A is preferably 0.1 to 20 $g/m^2$, more preferably 0.5 to 10 $g/m^2$, and particularly preferably 1 to 5 $g/m^2$. The weight per unit area of the second region 23B is preferably not less than 2 $g/m^2$, more preferably not less than 2.5 $g/m^2$, and particularly preferably not less than 3 $g/m^2$, and is, for example, 2 to 50 $g/m^2$, 2.5 to 30 $g/m^2$, or 3 to 20 $g/m^2$.

The thickness of the protective layer 23 may vary between the first region 23A and the second region 23B. The thickness of the first region 23A is preferably 1 to 20 µm, more preferably 1 to 10 µm, and particularly preferably 1 to 5 µm. Because the protective layer 23 contains a conductive agent, the protective layer 23, even when formed with a large thickness, does not deteriorate the conductive properties between the positive electrode current collector 21 and the positive electrode mixture layer 22 and allows good battery characteristics to be maintained. If, however, the first region 23A is excessively large in thickness, the battery capacity may be decreased, and it is therefore preferable that the thickness of the first region 23A be set in the above-described range.

The thickness of the second region 23B has little influence on the battery capacity as long as it does not exceed the thickness of the positive electrode mixture layer 22. Thus, the second region 23B may be formed with a thickness of more than 20 µm. The thickness of the second region 23B is preferably 1.5 to 30 µm, more preferably 1.5 to 25 µm, and particularly preferably 1.5 to 20 µm. Preferably, the thickness of the second region 23B is larger than the thickness of the first region 23A.

The protective layer 23 may be formed by applying a protective slurry prepared by mixing inorganic particles 24, a conductive agent, a binder and a dispersion medium, to both sides of the positive electrode current collector 21, and drying the wet films. Specifically, the slurry may be applied in a smaller amount to the section corresponding to the first region 23A, and may be applied in a larger amount to the section corresponding to the second region 23B, so as to form a protective layer 23 having a higher area density in the second region 23B than in the first region 23A. For example, the protective slurry may be applied in equal amounts to the sections corresponding to the first region 23A and the second region 23B, and may be thereafter applied again only to the section corresponding to the second region 23B.

Alternatively, the protective layer 23 may attain a higher area density in the second region 23B than in the first region 23A in such a manner that, specifically, more inorganic particles 24 are added to the slurry that will be applied to the section corresponding to the second region 23B than the proportion of inorganic particles 24 added to the slurry that will be applied to form the first region 23A.

In the example illustrated in FIG. 2, the inorganic particles 24 are partly buried into the positive electrode current collector 21 in the first region 23A. During, for example, the press-rolling of the positive electrode 20, the first region 23A is pressed concurrently with the positive electrode mixture layer 22 and consequently the inorganic particles 24 sink into the positive electrode current collector 21. As a result of the inorganic particles 24 being caused to sink into the positive electrode current collector 21, the adhesion between the first region 23A and the positive electrode current collector 21 is enhanced. On the other hand, the second region 23B is not pressed during the rolling step and thus the positive electrode current collector 21 is not dented by the inorganic particles 24 in the second region 23B.

The inorganic particles 24 contained in the protective layer 23 are preferably based on an inorganic compound with a specific resistivity of not less than $10^3$ Ω·m. By the use of an inorganic compound having a specific resistivity of not less than $10^3$ Ω·m, the occurrence of low resistance short-circuit in which a high current flows is suppressed. The content of the inorganic particles 24 is preferably 70 to 99.8 wt %, and particularly preferably 90 to 99 wt % relative to the weight of the protective layer 23.

Specifically, the inorganic particles 24 may be preferably at least one selected from aluminum oxide, titanium oxide, manganese oxide and silicon oxide. In particular, it is preferable to use aluminum oxide ($Al_2O_3$) or titanium oxide ($TiO_2$). The average particle size of the inorganic particles 24 is, for example, not more than 1 µm, and is preferably 0.3 to 1 µm. Here, the average particle size is the volume average particle size determined by a light scattering method.

The conductive agent contained in the protective layer 23 may be similar to that used in the positive electrode mixture layer 22. For example, use may be made of carbon materials such as carbon black (CB), acetylene black (AB), Ketjen black and graphite. The conductive agents may be used singly, or two or more may be used in combination. The content of the conductive agent is preferably 0.1 to 20 wt %, and particularly preferably 1 to 10 wt % relative to the weight of the protective layer 23. For example, the content of the conductive agent in the protective layer 23 is higher than the content of the conductive agent in the positive electrode mixture layer 22.

The binder contained in the protective layer 23 may be similar to that used in the positive electrode mixture layer 22. For example, use may be made of fluororesins such as polytetrafluoroethylene (PTFE) and polyvinylidene fluoride (PVdF), polyacrylonitriles (PAN), polyimide resins, acrylic resins and polyolefin resins. The binders may be used singly, or two or more may be used in combination. The content of the binder is preferably 0.1 to 20 wt %, and particularly preferably 1 to 10 wt % relative to the weight of the protective layer 23.

Figure 3:
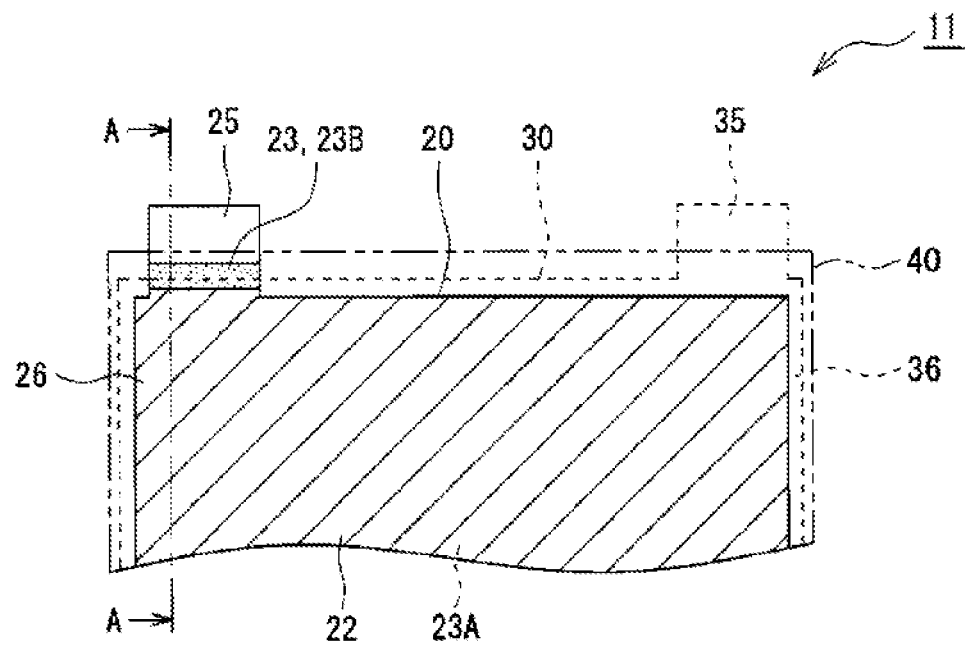
FIG. 3 is a view illustrating a stack structure of an electrode assembly according to an embodiment.
Figure 4:
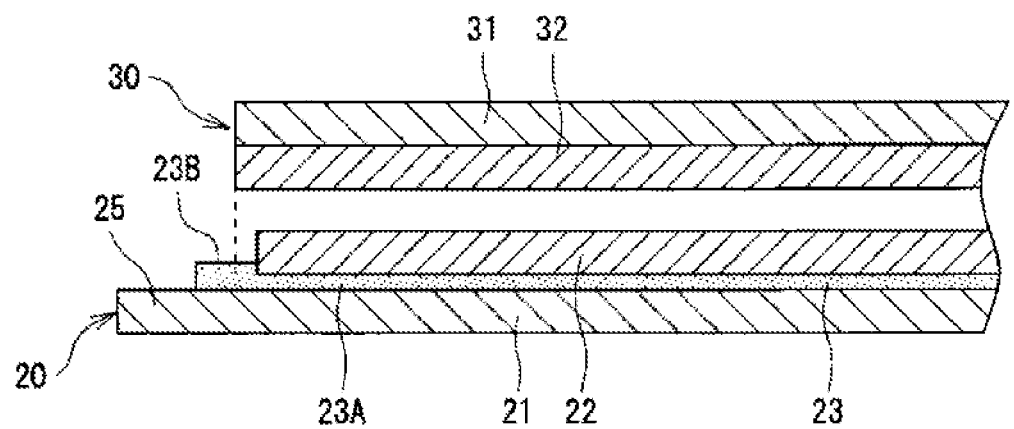
FIG. 4 is a sectional view taken along line A-A in FIG. 3.

FIGS. 3 and 4 illustrate a stack structure of the electrode assembly 11. In FIG. 3, the negative electrode 30 is shown with a broken line, and the separator 40 with a chain double-dotted line. In FIG. 4, the separator 40 is not illustrated. The electrode assembly 11 has a stack structure in which the positive electrodes 20 and the negative electrodes 30 are alternately stacked via the separators 40. As mentioned earlier, the positive electrode 20 is smaller than the negative electrode 30 to ensure smooth migration of lithium ions between the positive electrode and the negative electrode, and is arranged so that at least the positive electrode mixture layer 22 is opposed to the negative electrode mixture layer 32 of the negative electrode 30.

The positive electrode 20 has a positive electrode lead portion 25 that is a protruded portion of the positive electrode current collector 21. For example, the positive electrode 20 has a main portion 26 substantially rectangular in plan view, and a positive electrode lead portion 25 substantially rectangular in plan view that is protrudent from an end in the vertical direction of the main portion 26. The positive electrode mixture layer 22 is formed over substantially the entirety of both sides of the main portion 26 and slightly extends over the base root of the positive electrode lead portion 25. In other words, the major proportion of the positive electrode lead portion 25 is free from the positive electrode mixture layer 22. The exposed portions of the surface of the current collectors of the respective positive electrode lead portions 25 are overlapped on top of one another and are connected to the positive electrode terminal 12.

The negative electrode 30 has a negative electrode lead portion 35 that is a protruded portion of the negative electrode current collector 31. For example, the negative electrode 30 has a main portion 36 substantially rectangular in plan view, and a negative electrode lead portion 35 substantially rectangular in plan view that is protrudent from an end in the vertical direction of the main portion 36. The exposed portions of the surface of the current collectors of the respective negative electrode lead portions 35 are overlapped on top of one another and are connected to the negative electrode terminal 13. In the present embodiment, the positive electrode lead portions 25 are located on one lateral end of the electrode assembly 11, and the negative electrode lead portions 35 are arranged on the other lateral end of the electrode assembly 11. The positive electrode lead portions 25 extend in the vertical direction beyond the negative electrodes 30 opposed thereto.

The protective layer 23 is disposed on substantially the entirety of both sides of the main portion 26, and, on the positive electrode lead portion 25, extends beyond the periphery of the positive electrode mixture layer 22 to cover part of the portion exposed from the positive electrode mixture layer 22. The second region 23B of the protective layer 23 may extend from the periphery of the positive electrode mixture layer 22 to the same extent as the negative electrode 30 opposed thereto or, in consideration of misalignment of the positive and negative electrodes, may preferably extend beyond the negative electrode 30 opposed thereto.

In the example illustrated in FIG. 3, the protective layer 23 (the second region 23B) extends from the base root of the positive electrode lead portion 25 to approximately ⅓ of the length of the lead portion in the vertical direction. That is, the surface of the current collector is exposed from the tip of the positive electrode lead portion 25 to about ⅔ of the length of the lead portion. The positional relation of the protective layer 23 with the separator 40 is not particularly limited as long as the protective layer extends beyond the negative electrode 30 opposed thereto. The positive electrode lead portion 25 is the portion of the electrode where a current is most concentrated. The protective layer 23 is formed with a larger thickness in the region where this positive electrode lead portion is opposed to the negative electrode 30, and thereby offers enhanced safety in the event of foreign matter incorporation.

[Negative Electrodes]

As mentioned earlier, the negative electrode 30 includes a negative electrode current collector 31 made of a metal foil or the like, and a negative electrode mixture layer 32 disposed on the current collector. The negative electrode current collector 31 may be, for example, a foil of a metal that is stable at the potentials of the negative electrode 30, such as copper, or a film having such a metal as a skin layer. The negative electrode mixture layer 32 includes a negative electrode active material, and preferably further includes a binder. The negative electrode mixture layer 32 is generally formed on both sides of the negative electrode current collector 31.

For example, the negative electrode 30 may be fabricated by applying a negative electrode mixture slurry including a negative electrode active material, a binder, etc., onto the negative electrode current collector 31, drying the wet films, and pressing the coatings to form negative electrode mixture layers 32 on both sides of the current collector. The negative electrode mixture slurry is applied to the negative electrode current collector 31 except the region which will define a negative electrode lead portion 35. Consequently, this region of the surface of the current collector is exposed from the negative electrode mixture layer 32 to define a negative electrode lead portion 35 of the negative electrode 30.

The negative electrode active material is not particularly limited as long as it can reversibly store and release lithium ions. Examples thereof include carbon materials such as natural graphite and artificial graphite, metals which can be alloyed with lithium such as silicon (Si) and tin (Sn), and alloys and composite oxides containing such metals as Si and Sn. The negative electrode active materials may be used singly, or two or more may be used in combination.

Examples of the binders contained in the negative electrode mixture layers 32 include fluororesins, PAN, polyimide resins, acrylic resins and polyolefin resins, similarly to the case of the positive electrodes. When the negative electrode mixture slurry is prepared using an aqueous solvent, for example, styrene-butadiene rubber (SBR) CMC or a salt thereof, polyacrylic acid (PAA) or a salt thereof, or polyvinyl alcohol (PVA) may be used.

[Separators]

The separator 40 may be a porous sheet having ion permeability and insulating properties. Specific examples of the porous sheets include microporous thin films, woven fabrics and nonwoven fabrics. Some preferred separator materials are olefin resins such as polyethylene and polypropylene, and celluloses. The separator may be a stack having a cellulose fiber layer and a thermoplastic resin fiber layer such as of olefin resin. The separator may be a multilayer separator including a polyethylene layer and a polypropylene layer, and the surface of the separator may be coated with an aramid resin or the like.

A filler layer including an inorganic filler may be disposed in the interface(s) between the separator 40 and at least one of the positive electrode 20 and the negative electrode 30. Examples of the inorganic fillers include oxides containing at least one of titanium (Ti), aluminum (Al), silicon (Si) and magnesium (Mg), and phosphoric acid compounds. For example, the filler layer may be formed by applying a slurry of the filler to the surface of the positive electrode 20, the negative electrode 30 or the separator 40.

[Nonaqueous Electrolytes]

The nonaqueous electrolyte includes a nonaqueous solvent and an electrolyte salt dissolved in the nonaqueous solvent. The nonaqueous electrolyte is not limited to a liquid electrolyte (a nonaqueous electrolytic solution), and may be a solid electrolyte such as a gel polymer. Examples of the nonaqueous solvents include esters, ethers, nitriles such as acetonitrile, amides such as dimethylformamide, and mixtures of two or more kinds of these solvents. The nonaqueous solvent may be a halogenated solvent resulting from the substitution of the above solvent with a halogen atom such as fluorine in place of at least part of hydrogen.

Examples of the esters include cyclic carbonate esters such as ethylene carbonate (EC), propylene carbonate (PC) and butylene carbonate, chain carbonate esters such as dimethyl carbonate (DMC), methyl ethyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate enters such as methyl acetate, ethyl acetate, propyl acetate, methyl propionate (MP), ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Some preferred examples of the halogenated solvents are fluorinated cyclic carbonate esters such as fluoroethylene carbonate (FEC), fluorinated chain carbonate esters, and fluorinated chain carboxylate esters such as fluoromethyl propionate (FMP).

The electrolyte salt is preferably a lithium salt. Examples of the lithium salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(CnF_{2n+1})_x$ ($1<x<6$, and n is 1 or 2), $LiB_{10}Cl_{10}$, LiCl, LiBr, LiI, borate salts such as LiBCl, $Li_2B_4O_7$ and $Li(B(C_2O_4)F_2)$, and imide salts such as $LiN(SO_2CF_3)_2$ and $LiN(C_1F_{2l+1}SO_2)$ $(C_nF_{2n+1}SO_2)$ {l and m are integers of 1 or greater}. The lithium salts may be used singly, or a plurality thereof may be used as a mixture. From points of view such as ion conductivity and electrochemical stability, $LiPF_6$ is preferably used. The concentration of the lithium salt is preferably 0.8 to 1.8 mol per L of the nonaqueous solvent.

EXAMPLES

Hereinbelow, the present disclosure will be further described in detail based on EXAMPLES. However, it should be construed that the scope of the present disclosure is not limited to such EXAMPLES.

Example 1

[Fabrication of Positive Electrode]

A protective slurry was prepared by mixing 93.5 parts by weight of aluminum oxide ($Al_2O_3$), 5 parts by weight of acetylene black (AB) and 1.5 parts by weight of polyvinylidene fluoride (PVdF), and adding an appropriate amount of N-methyl-2-pyrrolidone (NMP) to the mixture. Next, the slurry was applied to both sides of a 15 μm thick elongated aluminum foil as a positive electrode current collector. The wet films were dried to form protective layers.

During the above process, the slurry was applied in such a manner that the amount of slurry applied would be larger in the sections which would be out of reach of the formation of positive electrode mixture layers in the downstream step, namely, the sections corresponding to the second regions 23B, than in the sections where the positive electrode mixture layers would be formed, namely, the sections corresponding to the first regions 23A. Specifically, the slurry was applied so that the area density and the thickness of dried films (protective layers) would be 10 g/m$^2$ and 6 μm in the sections corresponding to the second regions 23B, and the area density and the thickness of dried films would be 5 g/m$^2$ and 3 μm in the sections corresponding to the first regions 23A.

A positive electrode mixture slurry was prepared by mixing 97 parts by weight of lithium transition metal oxide LiNi$_{0.5}$Co$_{0.2}$Mn$_{0.3}$O$_2$ as a positive electrode active material, 2 parts by weight of acetylene black (AB) and 1 part by weight of polyvinylidene fluoride (PVdF), and adding an appropriate amount of N-methyl-2-pyrrolidone (NMP). Next, the positive electrode mixture slurry was applied to both sides of the positive electrode current collector having the protective layers (the first regions 23A). The wet films were dried and rolled with a roller. The sheet was then cut to a predetermined electrode size. Thus, a positive electrode was fabricated which had the protective layer and the positive electrode mixture layer in this order on both sides of the positive electrode current collector.

During the above cutting step, the positive electrode is cut so as to have a main portion substantially rectangular in plan view, and a positive electrode lead portion protrudent from an end of the main portion. The main portion has the protective layer and the positive electrode mixture layer on substantially the entirety of the main portion. In the positive electrode lead portion, the protective layer (the second region 23B) extends from the base root of the lead portion to approximately ⅓ of the length of the lead portion in the vertical direction, and the surface of the positive electrode current collector is exposed from the tip of the positive electrode lead portion to about ⅔ of the length of the lead portion. The positive electrode mixture layer slightly extends over and in the vicinity of the base root of the positive electrode lead portion. The shape of the positive electrode is similar to that illustrated in FIG. 3.

[Fabrication of Negative Electrode]

A negative electrode mixture slurry was prepared by mixing 98.7 parts by weight of graphite powder, 0.7 parts by weight of carboxymethylcellulose (CMC) and 0.6 parts by weight of styrene-butadiene rubber (SBR), and adding an appropriate amount of water to the mixture. Next, the negative electrode mixture slurry was applied to both sides of an elongated copper foil as a negative electrode current collector. The wet films were dried and rolled with a roller. The sheet was then cut to a predetermined electrode size. Thus, a negative electrode was fabricated which had the negative electrode mixture layer on both sides of the negative electrode current collector. Similarly to the case of the positive electrode, a main portion and a negative electrode lead portion are formed in the negative electrode.

[Preparation of Nonaqueous Electrolyte]

Ethylene carbonate (EC), methyl ethyl carbonate (EMC) and dimethyl carbonate (DMC) were mixed in a mass ratio of 3:3:4. LiPF$_6$ was dissolved with a concentration of 1.2 mol/L into the above mixed solvent. A nonaqueous electrolyte was thus prepared.

[Fabrication of Battery]

The positive electrodes and the negative electrodes fabricated as described above were stacked alternately on top of one another via polyethylene separators. A stacked electrode assembly was thus fabricated. The numbers of the positive electrodes and the negative electrodes stacked were each 16. The positive electrode lead portions of the respective positive electrodes were located on one lateral end of the electrode assembly, and the negative electrode lead portions of the respective negative electrodes were arranged on the other lateral end of the electrode assembly. During this process, the positive electrodes and the negative electrodes were stacked in such a manner that the second region of the protective layer extending from the periphery of the positive electrode mixture layer on the positive electrode lead portion would extend beyond the negative electrode opposed thereto. The electrode assembly was placed into a substantially box-shaped case body, and the nonaqueous electrolytic solution was poured thereto. The respective lead portions were connected to a positive electrode terminal and a negative electrode terminal disposed on a seal body. The opening of the case body was closed with the seal body. A prismatic battery having the stacked electrode assembly was thus fabricated.

Example 2

A battery was fabricated in the same manner as in EXAMPLE 1, except that the protective slurry was applied so that the protective layers would have an area density of 3 g/m$^2$ and a thickness of 1.8 μm in the first regions, and would have an area density of 5 g/m$^2$ and a thickness of 3 μm in the second regions.

Example 3

A battery was fabricated in the same manner as in EXAMPLE 1, except that the protective slurry was applied so that the protective layers would have an area density of 1.6 g/m$^2$ and a thickness of 1 μm in the first regions, and would have an area density of 3 g/m$^2$ and a thickness of 1.8 μm in the second regions.

Example 4

A battery was fabricated in the same manner as in EXAMPLE 1, except that Al$_2$O$_3$ used in the formation of the protective layers was replaced by titanium oxide (TiO$_2$).

Comparative Example 1

A battery was fabricated in the same manner as in EXAMPLE 1, except that the protective layers were formed without using Al$_2$O$_3$ and acetylene black (AB), and the amounts of the protective slurry were equalized.

Comparative Example 2

A battery was fabricated in the same manner as in EXAMPLE 1, except that the protective layers were formed without using Al$_2$O$_3$ and while using graphite powder in place of acetylene black (AB), and the amounts of the protective slurry were equalized.

Comparative Example 3

A battery was fabricated in the same manner as in EXAMPLE 1, except that the amounts of the protective slurry were equalized so that the area density and the thickness of the protective layers would be 1.6 g/m² and 1 µm.

Comparative Example 4

A battery was fabricated in the same manner as in COMPARATIVE EXAMPLE 3, except that the second regions of the protective layers were not formed (the protective slurry was not applied to the sections corresponding to the second regions).

[Test for Short-Circuit by Foreign Matter]

The batteries obtained above were tested by the following procedures.

(1) At 25° C., the battery was charged at a constant current of 0.3 C (600 mA) to a battery voltage of 4.2 V and was continuously charged at the constant voltage until the current value reached 0.05 C (90 mA).

(2) The case of the battery charged in (1) was disassembled, and the electrode assembly was collected. A small nickel piece (an L-shaped piece 0.2 mm in height, 0.1 mm in width and 1 mm in each side) was inserted between the protective layer (the second region 23B) on the positive electrode lead portion and the negative electrode opposed thereto, and a pressure was applied to bring them in contact.

(3) The presence or absence of flame following the pressure application was determined.

[Nail Penetration Test]

The batteries obtained above were tested by the following procedures.

(1) At 25° C., the battery was charged at a constant current of 0.3 C (600 mA) to a battery voltage of 4.2 V and was continuously charged at the constant voltage until the current value reached 0.05 C (90 mA).

(2) At 25° C., the tip of a round nail with a diameter of 3 un was placed into contact with the central portion of a side of the battery charged in (1), and was driven in the direction of battery thickness at a rate of 10 mm/sec. The driving of the round nail was terminated when the battery was completely penetrated by the round nail.

(3) The battery temperature was measured with respect to a position 10 mm away from the central portion of the side of the battery through which the round nail had been inserted. The maximum temperature that was reached was measured.

TABLE 1

| | Materials of protective layers | Weight (A) of first regions | Weight (B) of second regions | B/A | Test for short-circuit by foreign matter | Maximum temperature |
|---|---|---|---|---|---|---|
| EX. 1 | $Al_2O_3$ particles + Conductive agent + Binder | 5 g/m² | 10 g/m² | 2.0 | No flame | 550° C. |
| EX. 2 | $Al_2O_3$ particles + Conductive agent + Binder | 3 g/m² | 5 g/m² | 1.7 | No flame | 560° C. |
| EX. 3 | $Al_2O_3$ particles + Conductive agent + Binder | 1.6 g/m² | 3 g/m² | 1.9 | No flame | 596° C. |
| EX. 4 | $TiO_2$ particles + Conductive agent + Binder | 5 g/m² | 10 g/m² | 2.0 | No flame | 572° C. |
| COMP. EX. 1 | Binder | 0.2 g/m² | 0.2 g/m² | 1.0 | Flame | 683° C. |
| COMP. EX. 2 | Conductive agent + Binder | 2 g/m² | 2 g/m² | 1.0 | Flame | 665° C. |
| COMP. EX. 3 | $Al_2O_3$ particles + Conductive agent + Binder | 1.6 g/m² | 1.6 g/m² | 1.0 | Flame | 600° C. |
| COMP. EX. 4 | $Al_2O_3$ particles + Conductive agent + Binder | 1.6 g/m² | No second regions | — | Flame | 603° C. |

As shown in Table 1, the batteries of EXAMPLES did not ignite in the test for short-circuit by foreign matter, and attained a marked decrease in the maximum temperature reached in the nail penetration test as compared to the batteries of COMPARATIVE EXAMPLES. The batteries of COMPARATIVE EXAMPLES caught fire in the test for short-circuit by foreign matter. The batteries of EXAMPLES are capable of high protection against the occurrence of low resistance internal short-circuit between the positive electrode current collector and the negative electrode due to the incorporation of foreign matter, and also attain a sufficient reduction in the amount of heat generated in the event of internal short-circuit created by nail penetration.

REFERENCE SIGNS LIST

10 NONAQUEOUS ELECTROLYTE SECONDARY BATTERY
11 ELECTRODE ASSEMBLY
12 POSITIVE ELECTRODE TERMINAL
13 NEGATIVE ELECTRODE TERMINAL
14 BATTERY CASE
15 CASE BODY
16 SEAL BODY
17 INSULATING MEMBER
20 POSITIVE ELECTRODE
21 POSITIVE ELECTRODE CURRENT COLLECTOR
22 POSITIVE ELECTRODE MIXTURE LAYER
23 PROTECTIVE LAYER
23A FIRST REGION
23B SECOND REGION
24 INORGANIC PARTICLE
25 POSITIVE ELECTRODE LEAD PORTION
30 NEGATIVE ELECTRODE
31 NEGATIVE ELECTRODE CURRENT COLLECTOR
32 NEGATIVE ELECTRODE MIXTURE LAYER
35 NEGATIVE ELECTRODE LEAD PORTION
40 SEPARATOR

The invention claimed is:

1. A positive electrode for nonaqueous electrolyte secondary batteries, comprising:
a positive electrode current collector based on aluminum,
a positive electrode mixture layer disposed on the positive electrode current collector and including a lithium transition metal oxide, and
a protective layer disposed between the positive electrode current collector and the positive electrode mixture layer,
the protective layer comprising inorganic particles, a conductive agent and a binder, the inorganic particles being a major component of the protective layer,
the protective layer including a first region disposed on the positive electrode current collector over substantially the entirety of a section covered with the positive electrode mixture layer, and a second region disposed on the positive electrode current collector so as to extend from a periphery of the positive electrode mixture layer,
the weight per unit area of the second region being not less than 1.5 times the weight per unit area of the first region,
wherein a weight ratio of the inorganic particles in the second region is higher than a weight ratio of the inorganic particles in the first region.

2. The positive electrode for nonaqueous electrolyte secondary batteries according to claim 1, wherein the weight per unit area of the second region is not less than 2 g/m$^2$.

3. The positive electrode for nonaqueous electrolyte secondary batteries according to claim 1, wherein the inorganic particles are based on an inorganic compound with a specific resistivity of not less than $10^3$ Ω·m.

4. The positive electrode for nonaqueous electrolyte secondary batteries according to claim 1, wherein the thickness of the first region is 1 to 20 μm, and the thickness of the second region is 1.5 to 30 μm.

5. The positive electrode for nonaqueous electrolyte secondary batteries according to claim 1, wherein the inorganic particles are at least one selected from aluminum oxide, titanium oxide, manganese oxide and silicon oxide.

6. A nonaqueous electrolyte secondary battery comprising:
the positive electrode described in claim 1,
a negative electrode,
a separator disposed between the positive electrode and the negative electrode, and
a nonaqueous electrolyte,
the protective layer being opposed to the negative electrode through the separator therebetween.

7. The nonaqueous electrolyte secondary battery according to claim 6, which includes an electrode assembly including a plurality of the positive electrodes, a plurality of the negative electrodes, and a plurality of the separators, the electrode assembly being a stack in which the positive electrodes and the negative electrodes are alternately stacked via the separators.

8. The nonaqueous electrolyte secondary battery according to claim 7, wherein the positive electrode has a positive electrode lead portion free from the positive electrode mixture layer, and
the second region of the protective layer is disposed on part of the positive electrode lead portion.

9. The nonaqueous electrolyte secondary battery according to claim 8, wherein the second region of the protective layer extends beyond the negative electrode opposed thereto.

* * * * *